United States Patent [19]
Sherman et al.

[11] Patent Number: 5,825,179
[45] Date of Patent: Oct. 20, 1998

[54] INTERFERENCE SUPPRESSION SUBSYSTEM

[75] Inventors: Paul Dylan Sherman, Berkeley; Shiuh-Shyan Wang, Saratoga, both of Calif.

[73] Assignee: Seagate Technology, Inc., Scotts Valley, Calif.

[21] Appl. No.: 778,567

[22] Filed: Jan. 3, 1997

Related U.S. Application Data

[63] Continuation-in-part of Ser. No. 511,137, Aug. 4, 1995, abandoned.

[51] Int. Cl.$^6$ ........................... G01R 33/12; H01H 31/02; G01N 27/72
[52] U.S. Cl. ........................... 324/210; 324/225; 324/537; 369/55
[58] Field of Search ...................................... 324/210, 226, 324/225, 260, 262, 537, 555; 338/32 R, 32 H; 360/112, 113; 369/53, 55

[56] References Cited

U.S. PATENT DOCUMENTS 4,005,358   1/1977   Foner ........................................ 324/228

Primary Examiner—Walter E. Snow
Attorney, Agent, or Firm—Patrick T. King

[57] ABSTRACT

A technique for suppression of stray pickup interference signal during testing of a magneto-resistive head assembly with an external exciting magnetic field. An interruptable phase lock loop and an interruptable amplitude lock loop temporarily hold a replica of the stray-pickup interference signal. The method includes: disabling a magneto-resistive sensor while exciting a magneto-resistive head assembly and its connection wires with an exciting magnetic field; providing a stray-pickup output signal indicative of the stray pickup signals caused by the exciting magnetic field; generating a replica signal of the stray-pickup output signal; then enabling the magneto-resistive sensor element of the magneto-resistive head assembly while the magneto-resistive head assembly is magnetically excited to provide a composite output signal; and subtracting the replica signal of the stray-pickup output signal from the composite output signal to cancel the stray-pickup component and to provide an output response signal for the head assembly having an improved signal to stray-pickup signal ratio.

8 Claims, 3 Drawing Sheets

INTERFERENCE SUPPRESSION SUBSYSTEM

This is a Continuation-in-Part patent application of application Ser. No. 08/511,137 filed on Aug. 4, 1995, now abandoned.

TECHNICAL FIELD

The present invention relates to testing of magneto-resistive heads.

BACKGROUND OF THE INVENTION

Magneto-resistive signals are produced by a purely resistive effect. In contrast, stray pickup signals produced by magnetic pickup in the lead wires of a magneto-resistive head assembly are produced by an inductive effect. A stray pickup signal therefore has a rather large phase angle relative to its exciting magnetic field. The actual phase angle of a stray pickup signal is a complicated function of stray inductances and capacitances along a particular signal path because each head channel has a slightly different lead wire dressing and flex circuit geometry. Consequently, from one head channel to another, the phase angle for a stray pickup signal will have a different relative phase angle.

A magneto-resistive head assembly includes a magneto-resistive head and lead wires. In order to test a magneto-resistive head assembly without using a magnetic field provided from a magnetic media such as a magnetic record/playback disk, external excitation is provided to the magneto-resistive head to produce a magnetic field similar to the magnetic field produced by a magnetic media.

Because the pole and sensor geometry of a magneto-resistive head is very small, it is very difficult to construct a test coil which is small enough to produce an externally generated magnetic field and which is focused enough to excite only the magnetic transducer of a magneto-resistive head assembly and not the lead wires. Consequently, any externally generated magnetic field for testing a magneto-resistive head assembly also induces a current in the conductive lead wires for the magneto-resistive head assembly. The stray pickup currents induced in the conductive lead wires may be greater than a signal current from the magneto-resistive head itself. Consequently, accurate detection of the magneto-resistive effect requires some form of interference suppression for the unwanted stray pickup signals in the leads.

Thus, a need exists for an improved technique for suppression of unwanted stray pickup signals while testing a magneto-resistive head assembly with an external magnetic field.

SUMMARY OF THE INVENTION

It is, therefore, an object of the present invention to provide an improved technique for suppression of unwanted stray pickup signals while testing a magneto-resistive head assembly.

In accordance with this and other objects of the invention a method is provided for suppression of stray pickup interference during testing of a magneto-resistive head assembly with an exciting magnetic field. An interruptable phase lock loop and an amplitude lock loop temporarily are used to hold a synthesized signal and provide internal reconstruction of a reference interference waveform. The method includes: exciting a magneto-resistive head assembly, which has a magneto-resistive sensor element, connection wires, and an output terminal, with an exciting magnetic field; disabling the magneto-resistive sensor element of the magneto-resistive head assembly while the magneto-resistive head assembly is excited and providing a stray-pickup output signal at the output terminal of the magneto-resistive head assembly, wherein the stray-pickup output signal is indicative of the stray pickup signals caused by the exciting magnetic field; generating a replica signal of the stray-pickup output signal. The method further includes enabling the magneto-resistive sensor element of the magneto-resistive head assembly while the magneto-resistive head assembly is excited to provide a composite output signal which includes a signal having a component indicative of the response of the magneto-resistive sensor element and another component indicative of the stray-pickup signals caused by the exciting magnetic field; subtracting the replica signal of the stray-pickup output signal from the composite output signal to cancel the stray-pickup component and to provide an output response signal which has an improved signal to stray-pickup signal ratio.

The present invention provides a technique for testing of magneto-resistive heads by cancellation of interference signals. The technique provides for independent construction of a reference waveform for the interference signals and uses the independently constructed waveform to cancel the unwanted interference components of an aggregate test signal during testing of the head. To cancel the stray pickup signals associated with a magneto-resistive head assembly, the magneto-resistive head element is first disabled by setting its sense current to zero. The equivalent circuit for a disabled magneto-resistive head assembly includes the fixed resistance of the disabled magneto-resistive head in series with the inductive lead wires of the head assembly. Therefore, if an exciting magnetic field is applied to a disabled magneto-resistive head assembly, any signal which is detected is caused only by stray inductive pickup. The amplitude and phase of the stray pickup signal is then detected with respect to a driving stimulus signal which produces the exciting magnetic field. A replica of the stray pickup signal is then "memorized" or stored, for example, in an analog form. The sense current for the magneto-resistive head is then enabled to produce a combined magneto-resistive head signal component and a stray signal component. The stored replica of the stray pickup signal is then subtracted from the combined magneto-resistive head signal and the stray signal. This then leaves the magneto-resistive head signal with a greatly improved signal to stray ratio.

BRIEF DESCRIPTION OF THE DRAWINGS

The accompanying drawings which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
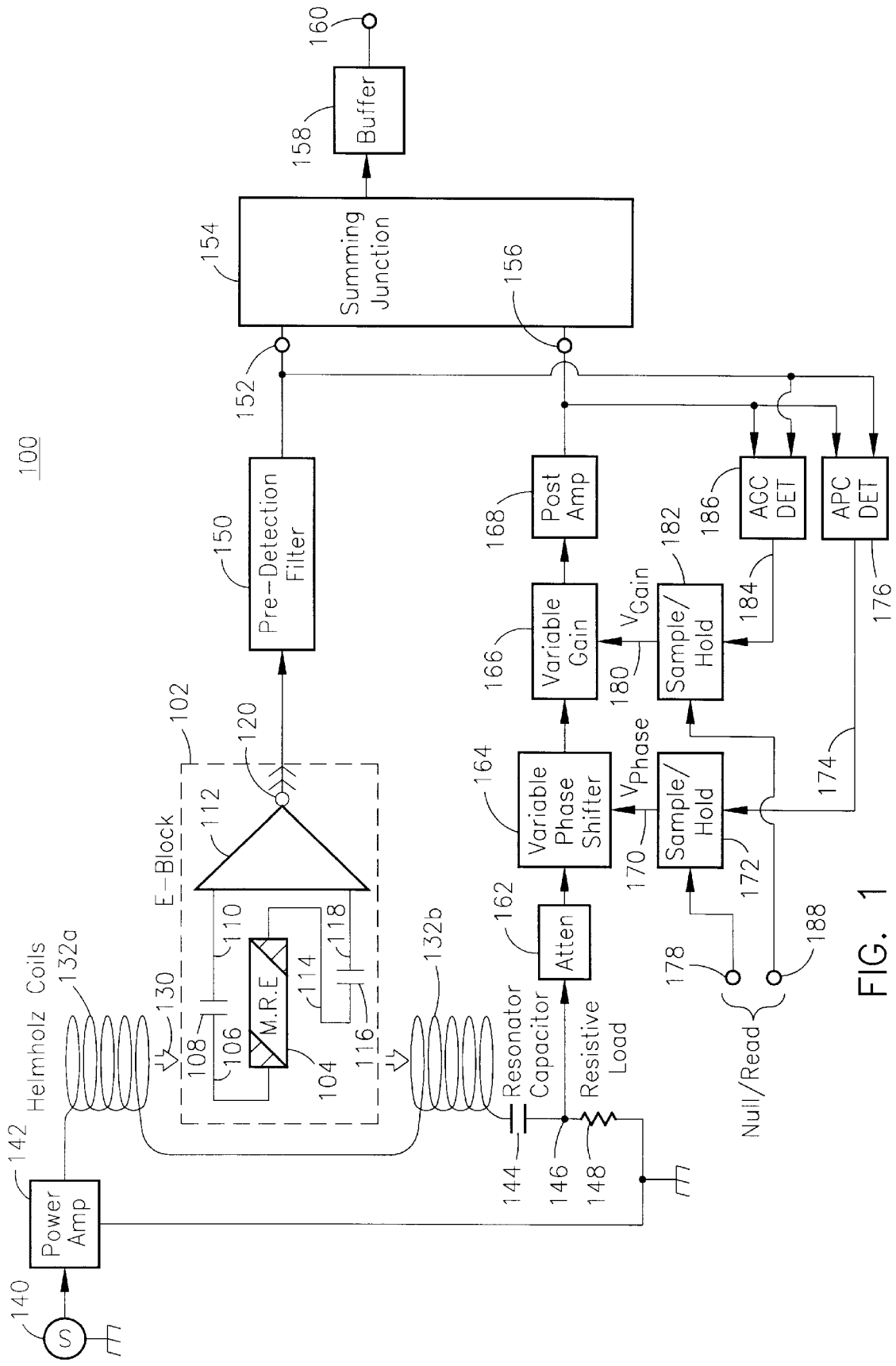
FIG. 1 is a schematic diagram of one embodiment of an interference suppression system according to the invention.

FIG. 1 shows one embodiment of an interference cancellation system 100 according to the invention for suppression of stray pickup interference signals during testing of a magneto-resistive head assembly which is part of an E-Block 102. The magneto-resistive head assembly includes a magneto-resistive element (MRE) 104 and associated connection wires and coupling capacitors One end of the MRE 104 is connected through a connection wire 106, a coupling capacitor 108, and a connection wire 110 to one input terminal of a sense amplifier 112. The other end of the MRE 104 is connected through a connection wire 114, a coupling capacitor 116, and a connection wire 118 to another input terminal of the sense amplifier 112. The sense amplifier 112 has an output terminal 120 at which is provided a signal indicative of information recorded on a magnetic storage media. The magneto-resistive head assembly and the sense amplifier 112 are part of an E-Block assembly 102, which provides a read signal at its output terminal 120.

For test purposes, the MRE 104 is excited by an exciting magnetic field, represented by the arrow 130, which is produced by a split Helmholtz coil 132a, 132b. Because the MRE sensor geometry is very small, it is very difficult to construct a test coil which would be small enough to produce a magnetic field which would be focused enough to only excite the MRE. Consequently, the externally generated magnetic field 130 from coil 132a, 132b also induces a current in the conductive lead wires 106, 110, 114, 118.

A reference signal generator 140 drives a power amplifier 142. The output of the power amplifier 142 drives the top end of the series-connected split Helmholtz coil 132a, 132b. The bottom end of the series-connected split Helmholtz coil 132a, 132b is connected to one terminal of a resonator 144, which series resonates with the coil 132a, 132b. The other end of the resonance capacitor 144 is connected to a terminal 146 and through a resistor 148 to ground.

The output terminal 120 of the E-Block 102 is connected to the input terminal of a pre-detection filter 150. The output terminal of the pre-detection filter 150 is connected to one input terminal 152 of a summing junction 154. The other input terminal 156 of the summing junction 154 is, as will be discussed herein below, provided with a signal to cancel the effect of stray pick up signals induced in the conductive lead wires of the MRE 104 by the exciting magnetic field from the coils 132a, 132b. The output terminal of the summing junction 154 is connected through a buffer 158 to an output terminal 160.

The terminal 146 provides a reference signal at the same frequency as the reference signal generator 140 to an attenuator 162. The output signal from the attenuator 162 passes through the series combination of a variable phase shifter 164, a variable gain amplifier 166, and a post amplifier 168 to the other input terminal 156 of the summing junction 154.

The phase shift provided by the variable phase shifter 164 is controlled in a phase-lock loop by a V phase signal on a line 170 from a sample-and-hold circuit 172. The sample/hold circuit 172 provides a sample and hold function for an input signal provided on an input signal line 174 from an automatic phase control detector (APC DET) circuit 176. The sample-and-hold circuit 172 is controlled by a NULL/READ control signal provided at an input terminal 178. The input signals to the automatic phase control circuit 176 are provided from the two input terminals 152, 156 of the summing junction 154. The APC DET circuit 176 and the variable phase shifter 164 form a phase-lock loop. The APC DET circuit 176 provides an output error signal on signal line 174 which forces the phase of the signal at terminal 156 to be the same as the phase of the signal at terminal 152. The phase-lock loop is closed when the MRE 104 is disabled and the NULL control signal at terminal 178 passes the control signal on signal line 174 to the input terminal of the variable phase shifter 164 through the sample/hold circuit 172. Later, when the MRE 104 is enabled the READ control signal at terminal 178 causes the sample-and-hold circuit 172 to hold the control signal on signal line 174 to provide a fixed V phase signal on line 170 to the phase shifter 164.

The amplitude of the signal at terminal 156 is controlled to match the amplitude of an interference signal at terminal 152. The gain of the loop is controlled by a V gain voltage-gain control signal applied on a control signal line 180 which is connected to a gain control terminal of the variable gain amplifier 166. The gain control signal is obtained through a sample/hold circuit 182 from a signal line 184 connected to an output terminal of an automatic gain control detector (AGC DET) circuit 186. The sample/hold circuit 182 is controlled by the NULL/READ control signal on terminal 188. An automatic gain control loop is formed using the AGC DET circuit 186 and the variable gain circuit 166. The AGC DET circuit 186 provides an output error signal by comparing the amplitude of the signals at terminals 152 and 156. The automatic gain control loop forces the amplitude at terminal 156 to be the same as the amplitude of the signal at terminal 152, when the MRE is enabled and the sample-hold circuit 182 allows the error signal on signal line 184 to pass through. After the amplitude of the interfering signal is determined and set at terminal 156, the AGC loop is opened and the sample/hold circuit 182 holds the amplitude of the signal at terminal 156 constant.

When the MRE is enabled and when the APC loop and the AGC loop are active, the signal at terminal 156 is thereby replicated to be equal in amplitude and opposite in phase to an interfering signal at terminal 152. This occurs during a NULL mode of operation.

During a READ mode of operation, the replicated interference signal is cancelled from the signal at terminal 152 in the summing junction 154. Interference caused by stray pickup is then substantially cancelled in the summing junction, leaving the desired MRE output signal.

Figure 2:
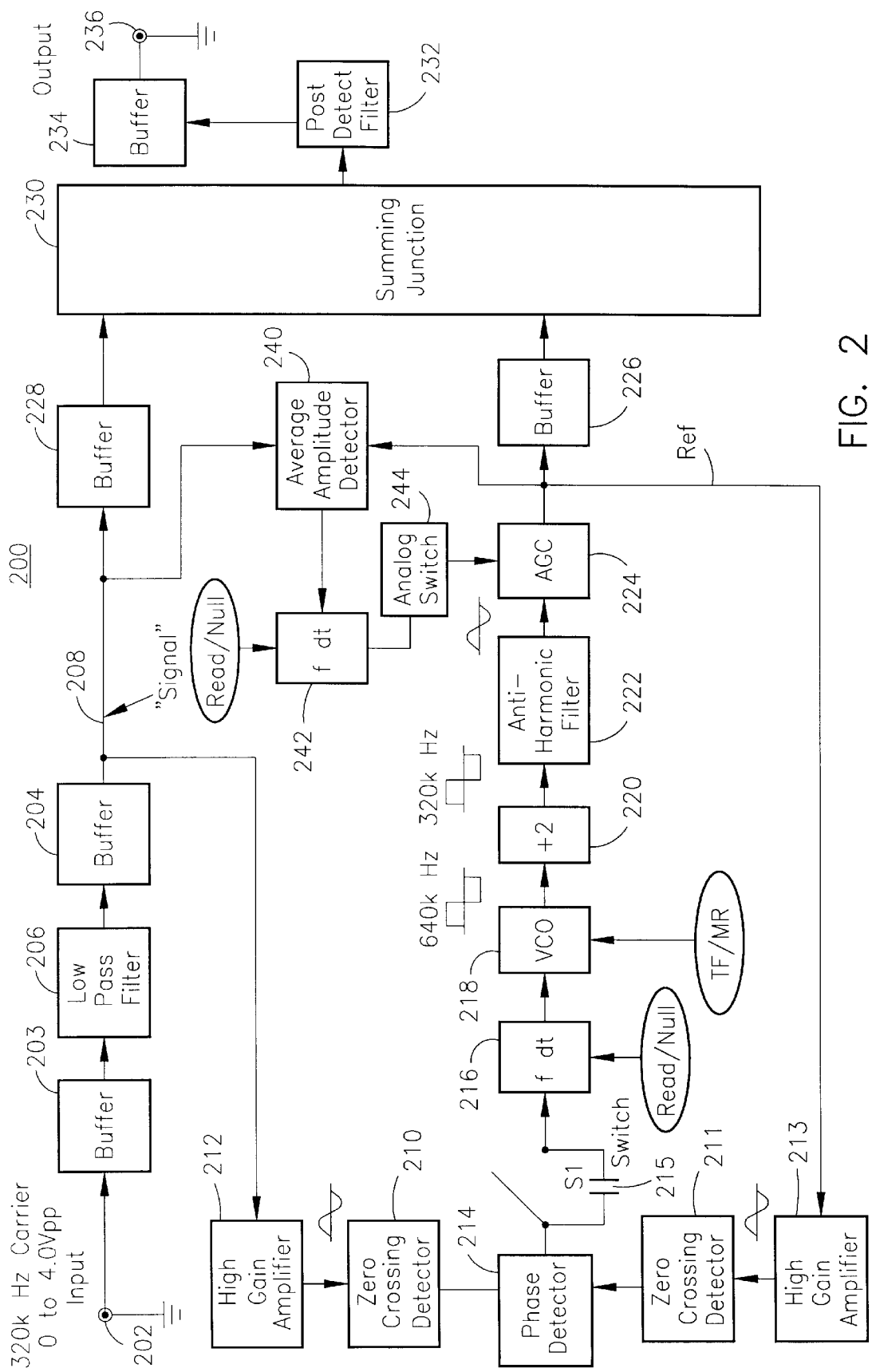
FIG. 2 is a more detailed schematic diagram of an interference cancellation system according to the invention.

FIG. 2 shows a more detailed schematic diagram of an interference cancellation system 200 according to the invention. An HGA or E-Block read output signal is processed by front end board electronics of the E-Block 102 and is presented to the input terminal 202 of the interference suppression system 200. After impedance termination and read-channel filtering in buffers 203, 204 and low-pass filter 206, a direct signal (SIGNAL) is provided on a signal line 208. A reference signal is generated and its amplitude is adjusted by an amplitude correction loop (ACL), and its phase is adjusted by a automatic phase control (APC) loop, or a phase adjustment loop. The loop output signal is called REF. As described hereinbelow, the REF signal is subtracted from the SIGNAL signal to substantially cancel stray pickup interference from an MRE.

Phase Adjustment Loop The phase of SIGNAL is determined by using the phase adjustment loop as follows: SIGNAL and REF (the loop output signal) are shaped into square waves by respective zero crossing detectors 210, 211 and high-gain amplifiers 212, 213. An edge-sensitive phase detector 214 triggers on the shaped signals, producing very narrow output pulses when both signals line up in phase. Any phase error results in the phase detector output signal having greater width or duration from a reference point. The ratio of detector pulse widths is proportional to the phase error in radians. A pair of fast TTL buffers in the phase detector 214 insures that any later circuit loading does not affect operation of the phase detector. The TTL buffer outputs produce a TTL midpoint voltage level when both SIGNAL and REF line up exactly in phase. Any phase error will now show as a voltage level deviation from the TTL midpoint (Vh+Vl)/2.

A first true integrator 216, having no direct DC feedback ramps its output voltage level positive or negative until both inputs to the phase detector match. The integrator reference input is simply a preset TTL midpoint voltage level, using two other TTL buffers in the same package as those previously described. Keeping all buffers in one package maintains good immunity to thermal drifts and I.C. variation. A switch S1 is provided between the output terminal of the phase detector 214 and the input terminal of the integrator 216. During the NULL mode of operation, input signals are passed through the closed switch S1 into the integrator 216. During the READ mode of operation, input signals are not passed through the open switch S1, but through a capacitor 215 into the integrator 216.

A second time integration is performed by a voltage controlled oscillator 218 which has an output frequency change proportional to the voltage output of the first integrator 216. A voltage level adjustment signal TF/MR provided to the VCO input insures that the VCO control voltage will be in the center of its range when both SIGNAL and REF are in phase.

The VCO 218 produces a square wave (TTL) output which is divided in frequency by integer divider circuit 220 and converted back to a sinusoidal wave shape by a sharp anti-harmonic bandpass filter 222. The filter characteristics place the second harmonic frequencies of the input signal approximately 40dB below its fundamental frequency. The filter output signal is passed through an automatic gain control amplifier 224 to provide the REF signal. REF is passed through a buffer 226 and a copy of the filtered signal is returned to the phase detector input through the zero crossing detector 212.

SIGNAL is passed through a buffer 228 to one input terminal of a summing junction 230. The REF signal is fed to another input of the summing junction 230, where the two input signals are subtracted. The result is an improved SIGNAL with substantially reduced pickup interference. A post-detection filter 232 and buffer 234 provide an output signal at an output terminal 236.

Cancellation

If SIGNAL and REF are arranged during the READ mode of operation to be opposite in phase to each other, their subtraction in an average amplitude detector 240 should yield zero if their amplitudes are equal. Any deviations from zero are proportional to the difference between their amplitudes, since both have already been lined up in phase. The difference is amplified to increase the zero detection capability and then rectified in the amplitude detector 240. The result is integrated in an integrator 242. Since the reference input to the integrator is at ground level, any deviation of the differential summation from zero will cause the integrator 216 to ramp up or down. This integrator's output feeds the ACL control voltage mentioned above. Hence this amplitude control action occurs simultaneously with the phase shifting action producing REF to obtain complete interference suppression.

M.R. Sensor Interference Principle

A magneto-resistive sensor element is a flux-sensing device. The response of the magneto-resistive sensor element is nearly directly proportional to the magnetic field. Therefore, the magneto-resistive sensor output signal varies directly in phase with the driving magnetic field.

Pickup of the radiated driving magnetic field by the lead wires of the sensor occurs inductively in the coupling loop formed by the lead wires. Therefore, the signal induced in the lead wires of the sensor varies out of phase with respect to the driving magnetic field.

Disabling the sensor element leaves only a radiated pickup signal which, in a phase-lock mode, can be identified, corrected and nulled out. Switching to a frequency lock mode sufficiently holds the (interference) phase information while still maintaining drift correction. When the sensor is enabled its aggregate phase changes while its output frequency remains the same. Therefore, the frequency lock loop acts to keep the self-generated reference frequency stable and unchanging.

Holding the Loops

The amplitude loop is interrupted by an analog switch 244 immediately following the integrator 242. At the switch output is a large ceramic, low leakage capacitor. With the switch opened, no charge flows on or off the capacitor, whose buffered output is returned to the ACL control unit. Hence the ACL will remain at the same amplification level until the holding capacitor's charge diminishes.

The phase shift loop is interrupted in a slightly more indirect manner. When both SIGNAL and REF line up in phase, the phase detector 214 has flip-flop circuits which produce very narrow identical width pulses. At this time, disconnecting the integrator input from the phase detector using a switch S1 will cause any further information to be ignored. Hence the integrator's output, already ramped to the in-phase condition, will remain steady and the VCO 218 is kept at a constant frequency, until the integrator 216 charge diminishes. One must be extremely careful not to separate the loop during a phase adjustment cycle, in other words when one flip-flop triggers before the other one. To eliminate this possibility, we simply gate the hold request with the in-phase retrigger pulse, providing the loop hold condition only at the appropriate time.

It has been noticed that during lockup the phase integrator input appears "noisy" while it is extremely clean when the loop opens. This noise is actually a phase error/drift cancellation actively keeping the control loop locked. Opening the loop (either via analog switch or phase detector disable) stops this "active correction." Subsequently, the loop drifts away from lock, monotonically resulting in instability.

What was discovered was that, provided by a capacitor, an A.C. bridge 215 around the analog switch S1 keeps the loop very stable even when switch S1 is open. Because of its inherent differentiating nature, this A.C. bridge blocks all D.C. levels from the phase detector. Thus, a shift in phase of the input signal does not pass to the integrator. Only the transitions pass, which are later filtered out via the ripple filters. Further, moving to a lower (320 kHz) test frequency reduces the effect of stray capacitance and therefore the degree of open loop "active correction."

The discovery of a "phase lock" refresh introduces the concept of a "frequency lock" to the detection subsystem. In the "frequency lock" mode of operation, part of the corrective feedback information is suspended.

Figure 3:
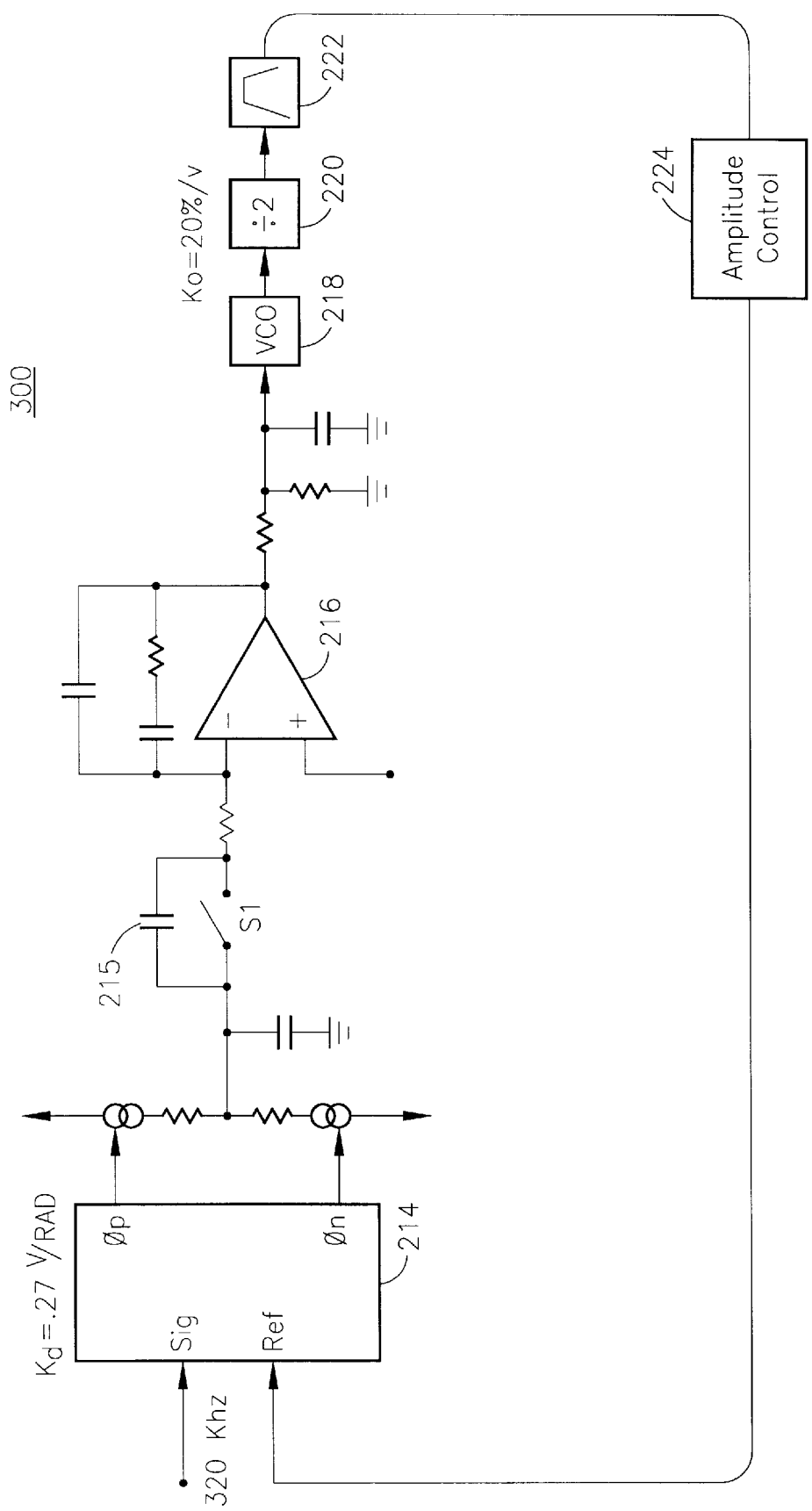
FIG. 3 is a schematic circuit diagram showing a phase/frequency locked loop according to the invention.

FIG. 3 is a circuit diagram showing the elements of the phase/frequency loop 300 of FIG. 2, where like elements have the same reference numerals. Both the integrator 216 and the VCO 218 of the phase control loop together provide second-order correction of any phase error between the SIGNAL and REF waveforms, with no a-priori knowledge of the reference. A constant phase error first becomes monotonically increasing. This ramping voltage then is converted to a frequency, or rate of change of phase. The reference signal phase changes in proportion to the rate of change of phase error change such that the second order loop is inherently self-correcting.

In a phase lock condition, the first derivative of phase error vanishes since both waveforms are in phase. However, due to parasitics, thermal drifts and other instabilities a real second order loop is never quiescent. Random phase deviations from lock are continuously being corrected by the loop's negative feedback character. The rate of drift recovery is proportional to loop bandwidth because a tighter, less deviating loop has a higher (wider) bandwidth.

These random phase deviations appear as sharp transients of noise at the output of the integrator 218. Opening the phase correction loop by opening the switch S1 causes this noise to disappear. Since the loop is open, it can no longer correct for parasitic disturbances. Integrator 216 accumulates all parasitics at its input monotonically, which after a very short time amount to a rather large voltage The high sensitivity of VCO 218 causes the rate of change of reference phase to increase without bound, hence the previous lock condition quickly disappears.

In a frequency lock condition, integrator 216 is AC-coupled, or capacitively-coupled, to VCO 218. If the time constant of this capacitive coupling, or differentiation, is suitably long, the sharp transients and their corrective pulses pass nearly unaffected. The action of the first integrator 216 is countered by these differentiated pulses; and the second integrator 218 simply follows directly these pulses keeping the rate of change of phase in lock.

The DC output voltage of the phase detector 214 is proportional to the phase error between SIGNAL and REF. By blocking this DC voltage as noted above, the frequency lock loop provided by switch S1 being open, cannot correct for differences in phase so that the error voltage stored on the integrator 216 remains unchanged. Since the sharp transients and corrective pulses act as a refresh for this stored charge, open loop holding time becomes virtually infinite, limited only by the dielectric quality of the capacitors within the integrator 216.

while the invention has been disclosed as an analog system, the invention is also practiced using digitized input signals which are processed by digital signal processing (DSP) techniques and equipment such as provided with programmed digital signal processing equipment.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A method for suppression of stray pickup interference signals generated during testing of a magneto-resistive head assembly, comprising the steps of:

exciting a magneto-resistive head assembly with an exciting magnetic field, where the magneto-resistive head assembly includes a magneto-resistive sensor element, connection wires, and an output terminal;

disabling the magneto-resistive sensor element of the magneto-resistive head assembly while the magneto-resistive head assembly is excited by the exciting magnetic field and providing a stray-pickup output signal at the output terminal of the magneto-resistive head assembly, wherein the stray pickup output signal is indicative of the stray pickup signals caused by the exciting magnetic field;

generating a replica signal of the stray-pickup output signal wherein the replica signal has substantially the same phase and amplitude as the stray-pickup signal;

enabling the magneto-resistive sensor element of the magneto-resistive head assembly while the magneto-resistive head assembly is excited by the exciting magnetic field to provide a composite output signal which includes a signal having one component indicative of the response of the magneto-resistive sensor element and another component indicative of the stray-pickup signals caused by the exciting magnetic field;

subtracting the replica signal of the stray-pickup output signal from the composite output signal to significantly reduce the stray-pickup component and to provide an output response signal having an improved magneto-resistive signal to stray-pickup signal ratio; and wherein the step of generating the replica signal having substantially the same phase as the stray-pickup signal includes phase-locking the replica signal to the stray-pickup signal when the magneto-resistive sensor element is disabled using an interruptable phase-locked loop in a phase locked mode and wherein the step of generating the replica signal of the stray-pickup output signal includes storing the phase of the replica signal when the interruptable phase-locked loop is in a frequency-locked mode.

2. The method of claim 1, wherein the step of generating a replica signal having substantially the same amplitude as the stray-pickup signal includes using an automatic gain control loop to lock the amplitude of the replica signal to the amplitude of the stray-pickup signal when the automatic gain control loop is in a locked mode and wherein the step of generating the replica signal of the stray-pickup output signal includes storing the amplitude of the replica signal when the automatic gain control loop is in an unlocked mode.

3. A test system for testing a magneto-resistive head assembly, said test system comprising:

a magneto-resistive head assembly which includes a magneto-resistive sensor element, connection wires, and an output terminal;

a test signal generator having an output terminal at which is provided an alternating test signal having a predetermined frequency;

a magnetic field generator connected to the output terminal of the test signal generator, said magnetic field generator providing an exciting magnetic field for exciting the magneto-resistive head assembly;

a summing junction having an output terminal, having one input terminal coupled to the output terminal of the magneto-resistive head assembly, and having a second input terminal;

a reference signal channel having an input terminal coupled to the test generator output terminal to receive the alternating test signal, wherein said reference signal channel includes a variable phase shifter coupled in series with a variable gain amplifier and having an output terminal at which is provided a reference signal;

said variable phase shifter having a control terminal at which is provided a control signal for controlling the phase shift of a signal passing therethrough;

said variable gain amplifier having a control terminal at which is provided a control signal for controlling the amplitude of a signal passing therethrough;

a phase comparator having one input terminal coupled to the output terminal of the magneto-resistive head assembly and having a second input terminal coupled to the output terminal of the reference signal channel, said phase comparator having an output terminal at which is provided a phase difference output signal proportional to the phase difference between the output signal of the magneto-resistive head assembly and the reference signal channel;

a phase sample-and-hold circuit having an input terminal coupled to the output terminal of the phase comparator and having an output terminal coupled to control terminal of the variable phase shifter, said phase sample-and-hold circuit including a control terminal at which is provided a signal for controlling sampling of the phase difference output signal of the phase comparator and for controlling the holding of a sampled signal at the output terminal of the phase sample-and-hold circuit, which is connected to the control terminal of the variable phase shifter;

an amplitude comparator having one input terminal coupled to the output terminal of the magneto-resistive head assembly and having a second input terminal coupled to the output terminal of the reference signal channel, said amplitude comparator having an output terminal at which is provided an amplitude difference output signal proportional to the amplitude difference between the output signal of the magneto-resistive head assembly and the reference signal channel;

an amplitude sample-and-hold circuit having an input terminal coupled to the output terminal of the amplitude comparator and having an output terminal coupled to control terminal of the variable gain amplifier, said amplitude sample and hold circuit including a control terminal at which is provided a signal for controlling sampling of the phase difference output signal of the phase comparator and for controlling the holding of a sampled signal at the output terminal of the amplitude sample-and-hold circuit, which is connected to the control terminal of the variable gain amplifier;

wherein said test system is operable in a first null mode in which the magneto-resistive sensor element is disabled and the reference signal provides an output signal which is a replica signal having substantially the same phase as the stray-pickup signal;

wherein, in the first reading mode, the control signal for the variable phase shifter is provided from the output terminal of the phase comparator passing through the phase sample-and-hold circuit and wherein in the first reading mode, the control signal for the variable gain amplifier is provided from the output terminal of the amplitude comparator;

wherein said test system is operated in a second reading mode in which the magneto-resistive sensor element is enabled and the reference signal provides an output signal which is a stored replica signal having substantially the same phase as the stray-pickup signal; and wherein in the second reading mode the replica signal of the stray-pickup output signal is subtracted from the composite output signal in the summing junction to significantly cancel the stray-pickup component and to provide an output response signal having an improved signal to stray-pickup signal ratio.

4. The test system of claim 3 wherein the magnetic field generator includes a split Helmholtz coil connected to the output terminal of the test signal generator.

5. The test system of claim 3 wherein the respective input signals to the phase comparator each pass through a high gain amplifier and a zero crossing detector.

6. The test system of claim 4 wherein the phase sample-and hold circuit includes an integrator circuit.

7. The test circuit of claim 4 wherein the amplitude comparator includes an integrator circuit.

8. The test circuit of claim 4 wherein the variable phase shifter includes a voltage controlled oscillator.

* * * * *